United States Patent
Moser et al.

(10) Patent No.: US 12,313,463 B2
(45) Date of Patent: May 27, 2025

(54) METHOD FOR CALIBRATING ONE OR MORE OPTICAL SENSORS OF A LASER MACHINING HEAD, LASER MACHINING HEAD, AND LASER MACHINING SYSTEM

(71) Applicant: Precitec GmbH & Co. KG, Gaggenau (DE)

(72) Inventors: Rüdiger Moser, Malsch (DE); Stefan Birmanns, Rheinau (CH); Tom Walde, Offenburg (DE); Livia Barazzetti, Wettingen (CH)

(73) Assignee: Precitec GmbH & Co. KG, Gaggenau (DE)

( * ) Notice: Subject to any disclaimer, the term of this patent is extended or adjusted under 35 U.S.C. 154(b) by 230 days.

(21) Appl. No.: 18/052,639

(22) Filed: Nov. 4, 2022

(65) Prior Publication Data

US 2023/0133662 A1 May 4, 2023

(30) Foreign Application Priority Data

Nov. 4, 2021 (DE) ................... 10 2021 128 707.3

(51) Int. Cl.
  *G01J 3/02* (2006.01)
  *B23K 26/03* (2006.01)
  (Continued)

(52) U.S. Cl.
  CPC .......... *G01J 3/0297* (2013.01); *B23K 26/032* (2013.01); *B23K 26/70* (2015.10);
  (Continued)

(58) Field of Classification Search
  CPC ........ G01J 3/0297; G01J 3/0208; G01J 3/108; G01J 1/00; B23K 26/032; B23K 26/70;
  (Continued)

(56) References Cited

U.S. PATENT DOCUMENTS

| 8,669,507 B2 | 3/2014 | Lin et al. |
| 2013/0319981 A1* | 12/2013 | Paganelli ........... B23K 26/0604 |
| | | 219/121.68 |
| 2014/0333931 A1 | 11/2014 | Lu et al. |
| 2017/0282301 A1* | 10/2017 | Ohyama ................ B23K 26/60 |

(Continued)

FOREIGN PATENT DOCUMENTS

| DE | 112008002862 T5 | 12/2010 |
| DE | 102016106648 B4 | 10/2017 |

(Continued)

*Primary Examiner* — Tarifur R Chowdhury
*Assistant Examiner* — Kemaya Nguyen
(74) *Attorney, Agent, or Firm* — DINSMORE & SHOHL LLP

(57) ABSTRACT

A method for calibrating at least one optical sensor of a laser machining head is provided. The laser machining head comprises a first optical sensor, a deflection device, and a focusing device. A laser beam path of the first optical sensor passes through the deflection device and the focusing device. The method comprises the steps of: deflecting the beam path of the first optical sensor by the deflection device to a first position on a first reference; generating a first optical measurement signal based on measurement light received by the first optical sensor from the first position on the first reference; and determining a correction value for calibrating the first optical sensor based on the first optical measurement signal and according to a deviation of the first position on the first reference from a first target position, which is specified relative to a position of the machining laser beam.

19 Claims, 7 Drawing Sheets

(51) Int. Cl.
  *B23K 26/70* (2014.01)
  *G01B 9/02055* (2022.01)
  *G01J 3/10* (2006.01)

(52) U.S. Cl.
  CPC ........ *G01B 9/02074* (2013.01); *G01J 3/0208* (2013.01); *G01J 3/108* (2013.01)

(58) Field of Classification Search
  CPC .............. B23K 26/0648; B23K 26/082; B23K 26/707; B23K 26/064; B23K 26/702; G01B 9/02074; G01B 2290/65; G01B 5/0037; G01B 9/02072; G01B 21/042; G01B 9/02091
  See application file for complete search history.

(56) References Cited

U.S. PATENT DOCUMENTS

| | | |
|---|---|---|
| 2017/0361399 A1* | 12/2017 | Toyama ................ B23K 26/032 |
| 2018/0164089 A1* | 6/2018 | Schönleber ........ G01B 9/02035 |
| 2019/0262937 A1 | 8/2019 | Augustinus et al. |
| 2020/0198051 A1* | 6/2020 | Sauer ................... B23K 26/042 |
| 2020/0337919 A1 | 10/2020 | Benayad-Cherif et al. |
| 2022/0297228 A1* | 9/2022 | Strebel .................... B23K 26/03 |
| 2022/0331911 A1* | 10/2022 | Boco ..................... B23K 26/707 |
| 2023/0130740 A1* | 4/2023 | Chan ................. B23K 26/0648 219/121.83 |
| 2023/0137623 A1* | 5/2023 | Yanase ............... B23K 26/0643 219/121.64 |

FOREIGN PATENT DOCUMENTS

| | | | |
|---|---|---|---|
| WO | 2020132282 A1 | 6/2020 | |
| WO | 2021211960 A1 | 10/2021 | |

* cited by examiner

METHOD FOR CALIBRATING ONE OR MORE OPTICAL SENSORS OF A LASER MACHINING HEAD, LASER MACHINING HEAD, AND LASER MACHINING SYSTEM

CROSS REFERENCES TO RELATED APPLICATIONS

This application claims priority to German Application 10 2021 128 707.3, filed Nov. 4, 2021, which is hereby incorporated by reference in its entirety.

FIELD OF THE INVENTION

The present disclosure relates to a method for calibrating at least one optical sensor of a laser machining head. Furthermore, the present disclosure relates to a laser machining head and a laser machining system.

BACKGROUND OF THE INVENTION

A laser machining head may include a deflection device and a focusing device. A laser beam coupled into the laser machining head may be deflected to different positions of a workpiece by the deflection device in order to machine the workpiece. The laser beam may also be called a machining laser beam. The laser beam may be focused on the workpiece by means of the focusing device. Machining may be laser welding, laser cutting, laser engraving or laser hardening.

The laser machining head may comprise at least one optical sensor for monitoring the machining process. A beam path of the optical sensor may partially extend coaxially with the beam path of the laser beam and also pass through the focusing device. When there are a plurality of optical sensors, different spectral sensitivities are usually used, i.e. each optical sensor works at a different wavelength or in a different wavelength range. As a result, beam paths of several or all optical sensors can be superimposed coaxially. In the case of a laser machining head including a deflection device, the beam path of the optical sensor may extend over the deflection device of the laser machining head in order to measure the workpiece surface at a predetermined position in relation to the point of incidence of the laser beam. In order to obtain a reliable monitoring result, the optical sensor generally has to be calibrated.

SUMMARY OF THE INVENTION

It is an object of the present disclosure to provide a method and a system which allow for improved monitoring of a laser machining process in a cost-effective manner. A further object is to provide a method and a system which allow high-quality laser machining in a cost-effective manner. A further object is to provide a method and a system which increase the accuracy of a measurement of an optical sensor for monitoring a laser machining process in a cost-effective manner. In particular, it is an object of the present disclosure to provide a method and a system which allow for a desired measurement position of the optical sensor for monitoring a laser machining process to be set more accurately. One or more of these objects are achieved by the subject matter disclosed herein. Advantageous embodiments and developments are also disclosed.

The invention is based on the idea that, in scanner-based laser machining systems with a focusing device or optics, the chromatic aberration causes a beam path of an optical sensor to be directed to a point other than a target position in the scan field, in particular compared to the laser beam. The focusing device or optics may be arranged behind the scanner. In general, the laser machining system and components thereof, in particular the scanner and/or the focusing device or optics, are configured for the wavelength of the machining laser beam. In other words, the machining laser beam or the beam path of the machining laser beam and the beam path of the optical sensor may be deflected differently by the scanner (also called the deflection device), i.e. the measurement position of the optical sensor and the machining position of the machining laser beam are moved differently on a workpiece by the deflection device. Since the deflection device is controlled based on the wavelength of the machining laser beam, an offset between a desired measurement position (target position, e.g. specified relative to a (theoretical) position of the machining laser) and an actual measurement position may occur. This offset may depend on the wavelength and the scan or deflection angle. In particular, the offset may be zero for passage perpendicularly through the focusing device and may increase with increasing deflection angles or an increasing deflection. Thus, the measurement by means of the optical sensor may be taken at a different point than intended. According to the present disclosure, at least one optical sensor of a laser machining head should therefore be calibrated such that a beam path or measurement position thereof is directed to the desired location.

According to an aspect of the present disclosure, a method for calibrating at least one optical sensor of a laser machining head for machining a workpiece using a machining laser beam is provided. The laser machining head comprises a first optical sensor, a deflection device (also called a scanner) and a focusing device. A beam path of the first optical sensor passes or extends over the deflection device and the focusing device. The method comprises the steps of: deflecting the beam path or a measurement position of the first optical sensor by means of the deflection device to a first position on a first reference; generating a first optical measurement signal based on measurement light received by the first optical sensor from the first position on the first reference; and determining a correction value for calibrating the first optical sensor based on the first optical measurement signal and according to a deviation of the first position on the first reference from a first target position, which may optionally be specified relative to a (theoretical or virtual) position of the machining laser beam. This allows for a lateral calibration of the optical sensor to be achieved.

The method may be carried out for a large number of positions on the reference and a correction value may be determined for each position. The correction values and the respective positions may be stored in a table. Alternatively or additionally, a correction function may be created based on the correction values and the respective positions.

According to a further aspect, a method for process monitoring of a laser machining process is provided, said method including the method for calibrating according to an embodiment of the present disclosure and the steps of: deflecting the beam path or the measurement position of the first optical sensor by means of the deflection device to a predetermined monitoring position, and receiving measurement light from the monitoring position by means of the first optical sensor for process monitoring, wherein a control signal of the deflection device for deflecting the beam path or the measurement position of the first optical sensor is adjusted to the predetermined monitoring position based on the correction value determined. In particular, the method for process monitoring of a laser machining process may be carried out before and/or after a laser machining process (pre- and/or post-process). In particular, the method for process monitoring of a laser machining process may be carried out when the machining laser beam is switched off.

According to a further aspect, a method for process monitoring of a laser machining process is provided, said method including the method for calibrating according to an embodiment of the present disclosure as well as the steps of: deflecting the machining laser beam and the beam path or the measurement position of the first optical sensor by means of the deflection device to a predetermined machining position, machining the workpiece by means of the machining laser beam at the machining position, and generating a monitoring signal based on measurement light received by the first optical sensor from the machining position for process monitoring (in-process), said monitoring signal for process monitoring being adjusted based on the determined correction value. In particular, the method for process monitoring of a laser machining process may be carried out during a laser machining process.

In a laser machining process, the machining laser beam may be radiated to a position on a workpiece to be machined. In order to monitor the laser machining process, it may be intended that a beam path, i.e. a measurement position, of an optical sensor is directed to a position relative to the position of the machining laser beam on the workpiece, also known as the machining position, for example to the position of the machining laser beam on the workpiece or to a position on the workpiece spaced from the position of the machining laser beam (in predefined manner) in order to monitor the laser machining process. When the machining laser beam is switched off, the position of the machining laser beam may also be referred to as a virtual or theoretical position of the machining laser beam or as the position of the beam path of the machining laser beam. For example, when the beam path of the machining laser beam and the beam path of the optical sensor pass a deflection device and a focusing device, an offset between the position of the beam path of the optical sensor and the position of the machining laser beam on the workpiece may be caused. The offset may depend on the degree of deflection of the beam path of the optical sensor and on the wavelengths to which the optical sensor is sensitive. The wavelengths (wavelength ranges) to which the optical sensor is sensitive may be different from the wavelength of the machining laser beam used, as a result of which the refraction of light caused by the focusing device may differ. This may result in an offset between the measurement position of the optical sensor on the workpiece and a (theoretical or virtual) position of the machining laser beam on the workpiece, possibly resulting in an inaccuracy of the measurement by the optical sensor. In particular, the optical sensor may be a sensor for monitoring a laser machining process using the machining laser beam, e.g. for pre-process and/or post-process and/or in-process monitoring. The machining laser beam may be switched off for pre-process and/or post-process monitoring. For example, the first optical sensor may be sensitive to the infrared wavelength range and/or the visible wavelength range.

The first position of the beam path of the first optical sensor may be a first measurement position of the first optical sensor. The first measurement position may be on the first reference. The first measurement position may be a position, in particular on the first reference, from which the first optical sensor receives measurement light.

Measurement light may be light that is received by the first optical sensor emanating from the first position on the first reference, to which the beam path of the first optical sensor is deflected. A first optical measurement signal may be generated, e.g. by the first optical sensor, based on the measurement light, in particular based on an intensity of the sensed measurement light. The first optical measurement signal may be an intensity signal. The first optical sensor may be a first intensity sensor.

Based on the first optical measurement signal, a deviation between the first position of the beam path or the measurement position of the first optical sensor and a first target position on the first reference may be determined or exist, and a correction value for a lateral deviation, i.e. an x/y deviation of the measurement position of the optical sensor, may be determined. The first target position for the first optical sensor may be a position on the reference to which the beam path of the first optical sensor is or should be deflected or at which the measurement position of the first optical sensor should be.

The target position for the first optical sensor or for at least one of the optical sensors of the laser machining head may be on the position of the machining laser beam (also called machining position) or on the position of the beam path of the machining laser beam or the theoretical or virtual position of the machining laser beam. It may therefore be envisioned to deflect or direct the beam path of the first optical sensor to the theoretical or virtual position of the machining laser beam.

The first target position for the first optical sensor or for at least one of the optical sensors of the laser machining head may be spaced away from the position of the machining laser beam, i.e. the machining position, or from the position of the beam path of the machining laser beam or the theoretical or virtual position of the machining laser beam. The beam path of the first optical sensor may be provided with a (predefined) distance or a (predefined) deviation from the position of the beam path of the machining laser beam. The distance may be a distance in a plane defined by the first reference. In particular, the first target position may include a position in advance and/or in the wake with respect to the machining laser beam and a machining direction. Correspondingly, the first optical sensor may be a sensor for monitoring a laser machining process in a pre-process and/or post-process step.

The correction value may be an absolute or a relative value. For example, the correction value is a distance or extent. The correction value may correspond to the distance or the extent between the first position of the beam path of the first optical sensor and the first target position. The correction value may be a factor.

The correction value may be associated with a position or attitude or orientation of the deflection device.

A deviation between the first position on the first reference from which measurement light is received by the first optical sensor and the first target position may be caused by chromatic aberration. In particular, the chromatic aberration may be caused by the focusing device of the laser machining head.

The first optical sensor may have spectral sensitivity to wavelengths other than the wavelength of the machining laser beam. The wavelengths or the wavelength range to which the first optical sensor is sensitive may be different from the wavelength of the machining laser beam.

The reference can be flat. The reference is preferably plate-shaped. The reference may be a calibration plate. A plane, such as an x-y plane, may be defined or specified by the reference. Alternatively or additionally, the reference and/or the laser machining head may be oriented in such a way that a surface of the reference lies in a plane perpendicular to the direction of propagation of the machining laser beam, i.e. at the zero position or without deflection of the machining laser beam.

The deviation of the first position on the first reference (measurement position) from the target position may be a deviation in a plane defined by the reference or in a plane parallel to the plane defined by the reference. The deviation may be a lateral deviation on the reference. The deviation may be a deviation in the x-direction and/or in the y-direction in the x-y plane of the reference.

A beam path of the machining laser beam may also extend or pass through the deflection device and/or the focusing device. The beam path of the first sensor may extend at least partially in parallel or coaxially to the beam path of the machining laser beam. During a calibration, the machining laser beam does not have to be radiated to the reference, i.e. the machining laser beam may remain switched off.

In general, the laser machining head may be a laser beam welding head, a laser beam soldering head, a laser beam cutting head, a laser beam engraving head or a laser beam hardening head. The laser machining process may be laser beam welding, laser beam soldering, laser beam cutting, laser beam engraving or laser beam hardening.

The deflection device may be configured to deflect the beam path of the first optical sensor within a scan field of the deflection device on the reference and/or on a workpiece. In other words, the deflection device may be configured to adjust the measurement position of the first optical sensor within a scan field of the deflection device on the reference and/or on a workpiece. Alternatively or additionally, the deflection device may be configured to deflect the beam path of the machining laser beam or a machining position within the scan field of the deflection device on the reference and/or a workpiece or to set a machining position within the scan field of the deflection device on the reference and/or a workpiece.

The focusing device may comprise focusing optics for focusing the measurement light for the first optical sensor and/or for focusing the machining laser beam. The focusing device may comprise one, two or more lenses or lens groups. The focusing device may include one, two or more lenses or lens groups, the distances between which can be changed at least in part in order to set or change the focal position. Alternatively, lenses with variable focal lengths ("liquid lenses") may be used.

The laser machining head may include a plurality of different optical sensors. The optical sensors may be configured to acquire data for process monitoring of a laser machining process before, during and after the process.

In particular, the laser machining head may comprise a second optical sensor. The beam path of the second optical sensor may pass through the deflection device and the focusing device. The method may further comprise the steps of: deflecting the beam path of the second optical sensor by means of the deflection device to a first position on a second reference; generating a second optical measurement signal based on measurement light received by the second optical sensor from the first position on the second reference; and determining a correction value for calibrating the second optical sensor based on the second optical measurement signal and according to a deviation of the first position on the second reference from a second target position, which is optionally specified relative to a position of the beam path of the machining laser beam.

The laser machining head may further include a third optical sensor. The beam path of the third optical sensor may pass through the deflection device and the focusing device. The method may further comprise the steps of: deflecting the beam path of the third optical sensor by means of the deflection device to a first position on a third reference, generating a third optical measurement signal based on measurement light received by the third optical sensor from the first position on the third reference, and determine a correction value for calibrating the third optical sensor based on the third optical measurement signal and according to a deviation of the first position on the third reference from a third target position, which is specified relative to a position of the beam path of the machining laser beam.

The laser machining head may include two, three, four or more optical sensors. The optical sensors may be selected from the following: at least one camera, an optical coherence tomograph (OCT), at least one photodiode, a photodiode sensitive in the infrared wavelength range, a photodiode sensitive in the visible wavelength range, a photodiode sensitive in the ultraviolet wavelength range, and a photodiode sensitive to the wavelength of the machining laser beam or to a laser back reflection.

At least two of the first, second and third references may be different references. The references may differ in shape, size or reference markings thereof. Preferably, the first, second and third references are (all) different references.

At least two of the first, second and third optical sensors may be different optical sensors. The optical sensors may differ in terms of spectral sensitivity thereof, the type of signal acquisition thereof, or intensity sensitivity thereof. Preferably the first, second and third optical sensors are (all) different optical sensors.

The first beam path of the first optical sensor, the second beam path of the second optical sensor, and the third beam path of the third optical sensor may pass through the deflection device and the focusing device.

The first optical measurement signal, the second optical measurement signal, and the third optical measurement signal for calibrating the first, second and third optical sensors may be generated one after the other or non-simultaneously. The first optical measurement signal, the second optical measurement signal, and the third optical measurement signal may be separated in time. The calibration of the plurality of optical sensors, in particular at least two of the first, second and third optical sensors, may be carried out one after the other or separated in time from one another. A different reference may be used for each calibration.

What is disclosed herein with regard to the first optical sensor may apply to the second optical sensor and/or the third optical sensor.

The beam path of the at least one optical sensor, in particular the first, second and/or third optical sensor, may be deflected by the deflection device to a plurality of positions on the respective reference, i.e. on the first, second and/or third reference, in order to generate a corresponding optical measurement signal, i.e. a first, second, and/or third optical measurement signal.

The beam path or the measurement position of the at least one optical sensor, in particular of the first, second and/or third optical sensor, may scan a surface of the respective reference, i.e. on the first, second and/or third reference, by means of the deflection device in order to generate corresponding optical measurement signals, i.e. first, second, and/or third optical measurement signals. For example, the surface of the respective reference may be along a predetermined scan path, e.g. in the form of a cross with the zero position at the center. Alternatively, the entire surface of the respective reference may be scanned or traversed with the beam path of the respective optical sensor.

The beam path of the respective optical sensor may be deflected to a plurality of different positions, preferably to at least two, more preferably to at least five, more preferably to at least nine different positions or more positions. In other words, the measurement position of the respective optical sensor may be directed to a plurality of different positions, preferably to at least two, more preferably to at least five, more preferably to at least nine different positions or more positions. For example, based on correction values for different measurement positions, a lookup table or a correction function f(x,y) may be created in order to correct the measurement position in future measurements accordingly, for example when monitoring a laser machining process, or to correct the measurement signals of the corresponding actual or corrected measurement position. A measurement signal may be generated when there is a change in the position of the beam path or the measurement position on the reference. In particular, when the calibration is automated and the clock time is not relevant, a plurality of positions may be traversed in order to increase the accuracy. Preferably, a correction table may be created and interpolations between the values at the positions may be performed. In one example, an entire line may be scanned with the OCT. With a clock rate in the kHz range, several thousand measurement points may be obtained.

In a plane defined by the respective reference, the plurality of positions may be spaced apart from one another in a first direction and/or in a second direction that is non-parallel, in particular perpendicular, to the first direction.

The beam path of the respective sensor may be deflected or displaced within a scan field by the deflection device. The scan field may lie in the plane defined by the respective reference. The respective scan field may be scanned by deflecting or displacing the beam path of the respective sensor. The scan field preferably has a width in the plane defined by the reference. At least 50%, preferably at least 70%, more preferably at least 90%, of the width of the scan field may be scanned by deflecting or displacing the beam path of the respective sensor. In particular, the entire width of the scan field is scanned by deflecting or displacing the beam path of the respective sensor.

Preferably, the beam path of each optical sensor is deflected by the deflection device at at least two, preferably at least three, more preferably at least five, or more positions on the respective reference and a corresponding optical measurement signal is generated based on measurement light received by the optical sensor from the respective position.

Each of the references may comprise or have at least one reference marking. The deviation of the position of the first optical measurement signal from the (theoretical or virtual) location or position of the machining laser beam may be determined on the basis of the reference marking.

Each of the references may comprise or have at least two, preferably at least five, more preferably at least nine, or more reference markings. A respective deviation of the position of the optical measurement signal from the (theoretical or virtual) location or position of the machining laser beam may be determined on the basis of a respective reference marking.

In particular, the beam path of the at least one optical sensor may be directed in parallel or coaxially to an optical axis of the focusing device onto the respective reference by means of the deflection device in order to generate a corresponding optical measurement signal at a zero position.

At a zero position, the beam path of the optical sensor or of the machining laser beam may not be deflected. At the zero position, the beam path may be oriented perpendicular to a plane defined by the reference. A distance between a plane defined by the reference and the focusing device is preferably smallest at the zero position. When the beam path is deflected from the zero position, a distance between the plane defined by the reference and the focusing device may increase compared to the distance at the zero position.

At the zero position, there may be no lateral (in the plane defined by the reference or in a plane perpendicular to the direction of propagation of the machining laser beam at the zero position) chromatic aberration for beams of different wavelengths.

The zero position may be used to check the measurement position of the respective sensor, i.e. the position of the beam path of the respective optical sensor, on the reference relative to the machining position or relative to the position of the beam path of the machining laser beam.

The laser machining head may include a plurality of different optical sensors. Each of the optical sensors may be sensitive to a different wavelength range. The spectral sensitivity of the optical sensors may be different. Each of the optical sensors may be calibrated by any method disclosed herein.

The respective beam path of at least two of the optical sensors, preferably of all of the optical sensors, may pass through the deflection device and the focusing device.

The first, second and/or third optical measurement signal may be based on measurement light of a different wavelength or of different wavelength ranges.

The laser machining head may comprise a plurality of different optical sensors that are each calibrated with different references. A reference may be used for each of the optical sensors, with the references being different. Each of the optical sensors may be calibrated by any method disclosed herein.

The at least one optical sensor may be a device for optical distance measurement, a conoscopy device, a travel time measuring device, an optical interference device, an optical coherence tomograph, an image sensor, a camera, a spectrograph, a spectrometer and/or a photodiode sensor with one or more photodiodes.

The optical sensors of the laser machining head may be different optical sensors. Each of the optical sensors may include: a device for optical distance measurement, a conoscopy device, a travel time measuring device, an optical interference device, an optical coherence tomograph, an image sensor, a camera, a spectrograph, a spectrometer and/or a photodiode sensor with one or more photodiodes.

The first optical sensor preferably comprises an image sensor, in particular a camera. The second optical sensor may comprise a spectrograph, a spectrometer, a photodiode sensor with one or more photodiodes. The third optical sensor may comprise an interference device. In particular, the third optical sensor may comprise an optical coherence tomograph.

An image of the reference may be captured by the image sensor. The image may cover an area, in particular an area on the reference, of at least 25 $mm^2$, preferably at least 100 $mm^2$, more preferably at least 400 $mm^2$, preferably 1000 $mm^2$, or more.

Process emissions may be detected by the photodiode sensor. For this purpose, the photodiode sensor may be configured to detect process emissions. The process emissions may include plasma radiation, temperature radiation and/or reflected laser radiation, in particular from the machining area.

The photodiode sensor may include a plurality of photodiodes. The photodiodes may have different spectral sensitivities. A photodiode may be sensitive to the visible wavelength range, in particular in a wavelength range from 350 nm to 780 nm. A photodiode may be sensitive to the infrared wavelength range, in particular in a wavelength range from 780 nm to 2200 nm. A photodiode may be sensitive to the wavelength of the machining laser beam, in particular in a wavelength range from 900 nm to 1080 nm or 500 nm to 550 nm.

The at least one optical sensor may comprise an optical interference device or an optical coherence tomograph. The reference may be a calibration plate with plurality of recesses at predetermined positions. A recess may be a reference marking. A recess in the reference may be detected by the sensor with the optical interference device, in particular by the optical coherence tomograph.

An optical measurement beam may be radiated onto the reference. A part of the optical measurement beam may be reflected from the reference as measurement light to the optical sensor. The course of the optical measurement beam may correspond to the beam path of the optical sensor, i.e. the optical interference device or the optical coherence tomograph.

The measurement light for generating the optical measurement signal may correspond to the portion of the incident optical measurement beam that is reflected and detected by the optical sensor, in particular by the optical interference device or the optical coherence tomograph.

The method for calibrating the optical sensor, in particular an optical interference device or an optical coherence tomograph, may comprise: aligning a zero position of the beam path of the machining laser beam or an optical measurement beam of the optical sensor with a predetermined zero position on the reference, in particular the calibration plate, radiating and deflecting the optical measurement beam by means of the deflection device to at least one position on the reference, in particular the calibration plate, which is different from the zero position, generating measurement signals for the at least one position or for each of the positions and determining a correction value according to a deviation of the position from a corresponding predetermined target position or determining correction values according to a respective deviation of the positions from corresponding predetermined target positions.

The method for calibrating the optical sensor, in particular an optical interference device or an optical coherence tomograph, may comprise: aligning the calibration plate such that a predetermined zero position on the calibration plate corresponds to a zero position of an optical measurement beam of the optical sensor; scanning a surface of the calibration plate with the optical measurement beam by means of the deflection device and generating corresponding measurement signals; determining the positions of the recesses on the calibration plate based on the measurement signals; and determining correction values corresponding to deviations of the determined positions of the recesses from predetermined reference positions.

The reference position may be a position of a reference marking, for example a recess or an optical feature. The reference position may refer to the zero position and/or to another reference marking. For example, the zero position and a distance to the reference marking at the reference position may be known. A distance between two reference markings may also be known.

The zero position of the beam path of the optical sensor (or of the optical measurement beam of the optical sensor) may be the same as the zero position of the beam path of the machining laser beam or may be at a predetermined distance therefrom. At the zero positions, the beams may be not deflected, in particular parallel or coaxial to the optical axis of the focusing device.

The method for calibrating the optical sensor, in particular an optical interference device or an optical coherence tomograph, may comprise: aligning the calibration plate such that a predetermined zero position on the calibration plate corresponds to a zero position of an optical measurement beam of the optical sensor; determining a work distance between the laser machining head and the calibration plate; scanning a surface of the calibration plate with the optical measurement beam by means of the deflection device and generating corresponding measurement signals; determining distances between the laser machining head and the calibration plate based on the measurement signals; and determining correction values according to deviations between the work distance and the determined distances. In this way, an axial calibration may be carried out, i.e. in the direction of propagation of the machining laser beam or the optical measurement beam. The work distance may be the shortest distance between the laser machining head and the calibration plate, in particular at the zero position. In general, a distance may be a path length of the optical measurement beam.

The at least one optical sensor may comprise a spectrograph, a spectrometer and/or a photodiode sensor with one or more photodiodes for detecting process emissions. The reference may be a test workpiece. A test machining process may be carried out on the test workpiece by means of the machining laser beam at at least one predetermined reference position by deflecting the machining laser beam by means of the deflection device.

A reference marking may be produced on the reference, in particular the test workpiece, by the test machining process. The position of the reference marking or of the test machining process may be the reference position.

The test machining process may be welding, cutting, drilling or piercing using the machining laser beam with predetermined parameters. The test machining process may be performed at different positions of the reference (test workpiece). The predetermined parameters of the test machining processes at the different positions of the reference may be the same or identical. The test machining processes may be carried out in the same or identical manner at the different positions of the reference.

The measurement light for generating the optical measurement signal may correspond to process emissions emitted at the position of the test machining process or the positions of the test machining processes. The process emissions may include a machining laser beam reflected from the reference, plasma emissions, and/or thermal radiation.

The optical sensor preferably includes at least three photodiodes. The first photodiode may be sensitive to an infrared wavelength range. The second photodiode may be sensitive to a wavelength range that is visible (by a human). The third photodiode may be sensitive to the wavelength of the machining laser beam.

The method for calibrating the optical sensor, in particular the spectrograph, the spectrometer and/or the photodiode sensor, may comprise: directing the machining laser beam to a zero position on the test workpiece, carrying out a test machining process and detecting the emitted process emissions by means of the optical sensor; deflecting the machining laser beam to a reference position, performing a test machining process at the reference position and detecting the process emissions emitted thereby by means of the optical sensor; and determining a correction value according to a deviation of the intensity of the process emissions detected at the reference position from the intensity of the process emissions detected at the zero position. When directing the machining laser beam to a zero position on the test workpiece, the machining laser is preferably not deflected and may be incident on the test workpiece coaxially to the optical axis of the focusing device. The intensity of the process emissions detected at the reference position may be a signal level or a signal strength. The correction value may correspond to or be the difference between the intensity of the process emissions detected at the reference position and the intensity of the process emissions detected at the zero position. The correction value may also correspond to a factor between the intensity of the process emissions detected at the reference position and the intensity of the process emissions detected at the zero position.

The method can include a plurality of test machining processes at respective reference positions. Based on the correction value for the respective reference position or for the nearest reference position, the optical measurement signal may be adjusted or quality criteria, for example reference curves or envelope curves, may be adjusted.

The at least one optical sensor may comprise an image sensor or a camera or be an image sensor or a camera. The reference may be a calibration plate with a plurality of optical features at predetermined reference positions. In this case, the position of the beam path or the measurement position of the sensor may be related to a center point of the field of view of the sensor.

The optical features may be reference markings. The visual features may include circles, lines, crossing lines, and/or a grid.

Furthermore, an illumination may be provided. The illumination may be aimed at the reference (calibration plate). The illumination may produce white light or light of a specific wavelength (color). The optical measurement signal may correspond to a (two-dimensional) camera image or a photograph.

The method for calibrating the optical sensor, in particular a camera or an image sensor, may comprise: aligning the calibration plate such that a predetermined zero position on the calibration plate corresponds to a zero position of the beam path of the optical sensor; deflecting the beam path of the optical sensor by a discrete distance by which the machining laser beam must be deflected in order to be directed to an optical feature of the calibration plate; and determining a correction value according to a distance from the position of the deflected beam path to the optical feature.

The distance or the correction value may be determined as a function of a position of the optical feature in a plane defined by the calibration plate (reference). The plane defined by the calibration plate may be an x-y plane, i.e. a plane perpendicular to the beam propagation direction of the machining laser beam that is directed to the zero position or not deflected. The position may be an x-y position. The distance or the correction value may be determined as a function of an alignment of the optical sensor in relation to the plane defined by the calibration plate (reference). The distance or the correction value may also be determined as a function of an orientation or attitude or position of the deflection device. The distance may also be referred to as lateral offset due to chromatic aberration.

A coordinate system of the camera may be calibrated according to a coordinate system of the deflection device so that a position identified in the camera image for the machining laser beam can be set by means of the deflection device. An orientation of the optical sensor may therefore be adapted to an orientation of the deflection device, i.e. the rotational position of the optical sensor may be aligned, in particular with the orientation of the deflection device. A rotation of the image sensor or the camera may be detected, in particular on the basis of the calibration.

Furthermore, the image of the image sensor or the camera may be calibrated. Calibration between the pixel size and the real size may be performed based on the optical features. In other words, a pixel size of the image of the image sensor or the camera may be determined on the basis of the optical features.

The focusing device may comprise an F-Theta lens. Alternatively or additionally, the focusing device may be arranged downstream of the deflection device with respect to the beam propagation direction of the machining laser beam in the laser machining head.

The focusing device may comprise at least one lens, a lens group or an optics. The focusing device may be configured to focus the machining laser beam in a predetermined focal position.

The deflection device may comprise at least one movable mirror, in particular two movable mirrors. For example, the deflection device may be a galvo scanner. The machining laser beam, an optical measurement beam and/or a beam path of an optical sensor may be deflected by the deflection device in a scan field, that is, the scan field may define the maximum area that can be reached with the beam or with the beams by means of the deflection device. The scan field of the deflection device may have a length and/or width of at least 50 mm. The machining laser beam, an optical measurement beam and/or a beam path of an optical sensor may be deflected by means of the deflection device by an angle of at least 5°, preferably at least 10°, more preferably between 5° and 20°, more preferably between 10° and 20°.

The deflection device may be configured to deflect the machining laser beam, an optical measurement beam and/or a beam path of an optical sensor by at least a first deflection angle along a first axis. The deflection device is preferably additionally configured to deflect the machining laser beam by a second deflection angle along a second axis, the first and second axes being arranged at an angle to one another, for example being oriented perpendicularly to one another. The maximum first deflection angle and/or the maximum second deflection angle of the deflection device may each be at least 5° or at least 10°, in particular 10° to 20°. The deflection angles correspond to mirror angles of at least +/−5°, in particular +/−10°, since the beam is deflected by twice the mirror angle.

The scan field of the deflection device may be defined as an area on the reference, in particular the surface of the reference, and/or may be given by maximum first and second deflection angles of the first deflection device. A length and/or a width of the scan field may be equal to or greater than 50 mm. The scan field may, for example, have a size of more than 50×50 mm, in particular at least approximately 100×200 mm or 250×150 mm, on the reference.

The deflection device may be a so-called large field scanner. The deflection device may be configured to deflect the machining laser beam, an optical measurement beam and/or a beam path of an optical sensor two-dimensionally, i.e. in a direction in a plane defined by the reference and in a second direction in the plane defined by the reference, with the first direction being non-parallel to the second direction, in particular perpendicular to the second direction. The deflection of the deflection device may be performed perpendicular to the optical axis of the focusing device. The axes of the deflection device may be at an angle equal to 90° or between 25° and 80°.

A laser machining head for machining a workpiece by means of a machining laser beam is disclosed. The laser machining head may comprise a first optical sensor, a deflection device, a focusing device, and a computing device. The deflection device and the focusing device may lie in a beam path of the first optical sensor. The deflection device may be configured to deflect the beam path of the first optical sensor to a first position on a first reference. The first optical sensor may be configured to receive measurement light from the first position on the first reference and to generate a first optical measurement signal based on the measurement light. The computing device may be configured to determine a correction value for calibrating the first optical sensor based on the first optical measurement signal and according to a deviation of the first position on the first reference from a first target position, which is optionally specified relative to a (theoretical or virtual) position of the machining laser beam.

The laser machining head or the computing device (also called a control) may be configured to carry out any method disclosed herein.

Furthermore, a laser machining system is disclosed. The laser machining system includes a laser machining head for machining a workpiece using a machining laser beam and a computing device. The laser machining head may include a first optical sensor, a deflection device, and a focusing device. The deflection device and the focusing device may lie in a beam path of the first optical sensor. The deflection device may be configured to deflect the beam path of the first optical sensor to a first position on a first reference. The first optical sensor may be configured to receive measurement light from the first position on the first reference and to generate a first optical measurement signal based on the measurement light. The computing device may be configured to determine a correction value for calibrating the first optical sensor based on the first optical measurement signal and according to a deviation of the first position on the first reference from a first target position, which is optionally specified relative to a (theoretical or virtual) position of the machining laser beam. The computing device may also be referred to as a control and may be arranged on or in the laser machining head or separately from the laser machining head.

The laser machining system may include a laser source for generating the machining laser beam. Alternatively, the laser machining system may be configured to couple the machining laser beam from a laser source into the laser machining head, in particular using a fiber coupler.

The laser machining system or the computing device (also referred to as a control) may be configured to carry out any method disclosed herein.

According to the present disclosure, one or more optical sensors of a laser machining head may be calibrated such that they are directed to the desired target position relative to the machining position, regardless of the set x-y position in the scan field or the set deflection position. Thus, it can be ensured that measurement and machining take place at the respective desired location and are not undesirably laterally offset from one another.

BRIEF DESCRIPTION OF THE DRAWINGS

The disclosure is described in detail below with reference to the figures.

DETAILED DESCRIPTION OF THE INVENTION

Figure 1:
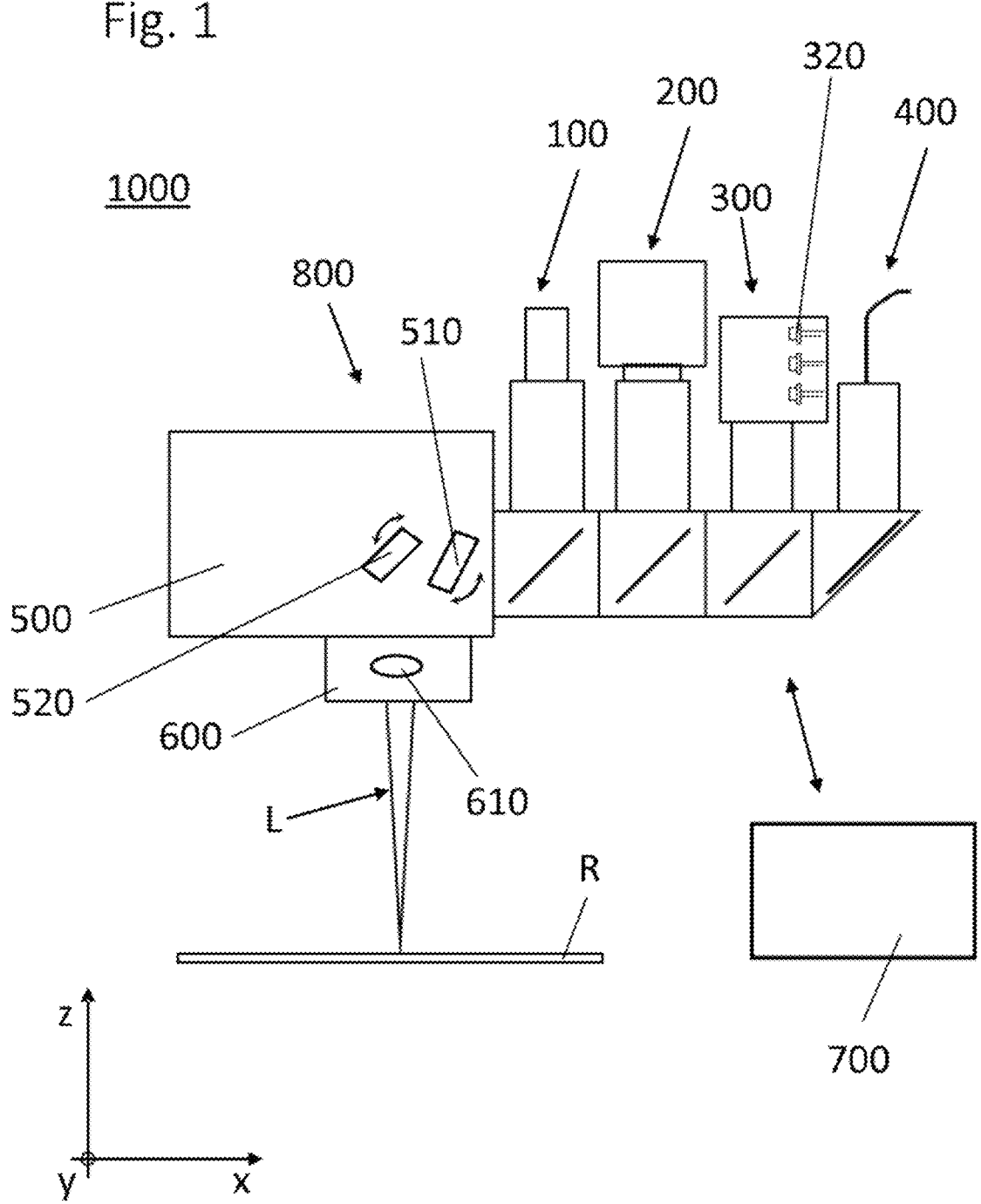
FIG. 1 shows a laser machining system 1000 including a laser machining head 800.

FIG. 1 schematically shows a laser machining system 1000 including a laser machining head 800. The laser machining system 1000 may include a laser source and/or a computing device 700. The laser machining head 800 may include a first optical sensor 200, a second optical sensor 300, and a third optical sensor 400. A laser machining system 1000 is shown in FIG. 1 for purposes of illustration only. A laser machining head 800 with at least one optical sensor, for example with the first optical sensor 200, the second optical sensor 300 and/or the third optical sensor 400, is also disclosed independently.

The laser machining head 800 further comprises a deflection device 500 and a focusing device 600.

A machining laser beam L may be generated by the laser source. The laser source may be configured as a single-mode laser, as a solid-state laser or as a fiber laser.

The machining laser beam L generated by the laser source may be transmitted from the laser source to the laser machining head 800 via an optical fiber. The machining laser beam L may be coupled into the laser machining head 800 via a fiber coupler 100. For example, the machining laser beam L may be coupled thereinto by a beam splitter 105.

The laser machining head 800 may include collimation optics or collimating optics (not shown). The collimation optics may be arranged and configured in the laser machining head 800 in such a way that the machining laser beam L divergently entering the laser machining head 800 is collimated. The collimation optics may include at least one lens or two or more lenses. A distance between the two or more lenses may be adjustable, in particular by a motor, for example an electric motor.

Furthermore, the laser machining head 800 includes a deflection device 500 for deflecting the machining laser beam L, measurement light 210, 410 (cf. FIG. 2) and/or a measurement beam. The deflection device 500 may include a first movable mirror 510. The first moveable mirror 510 may be rotatable about a first axis of rotation. Furthermore, the deflection device 500 may include a second movable mirror 520. The second moveable mirror 520 may be rotatable about a second axis of rotation. The first axis of rotation and the second axis of rotation may be arranged at an angle to one another. The angle may be between 45° and 135°, in particular approximately 75° or approximately 90°. The first and/or second movable mirror 510, 520 may be configured as a galvanometer mirror, or galvo mirror for short. The deflection device may be configured as a galvanometer or galvo scanner.

The laser machining head 800 includes a focusing device 600 for focusing the machining laser beam L, measurement light 210, 410 and/or a measurement beam. The focusing device 600 may include at least one lens or two or more lenses. A distance between the two or more lenses may be adjustable, in particular by a motor, for example an electric motor. In particular, the focusing optics may be configured to focus the machining laser beam L, the measurement light 210, 410 and/or the measurement beam onto a workpiece or a reference R, in particular onto a surface of the workpiece or the reference R. The focusing optics may include or be configured as an F-Theta lens 610. The F-Theta lens may be configured to be telecentric. The focusing device 600 has an optical axis. In order to set or change the focal position, a position of at least one element or lens or a distance between two elements or lenses of the focusing device or the collimation optics may be changed.

The machining laser beam L may emerge from the laser machining head 800 and be radiated onto a workpiece in order to machine it. Machining may be laser welding, laser cutting, laser engraving or laser hardening.

The machining laser beam L may be deflected or displaced in a scan field by the deflection device 500. Measurement light 210, 410 and/or a measurement beam may also be deflected in the scan field. The deflection may take place in a first direction perpendicular to the optical axis of the focusing device 600. Furthermore, the deflection may take place in a second direction perpendicular to the optical axis of the focusing device 600. The first direction and the second direction may be non-parallel, in particular perpendicular to one another. The first direction may be an x-axis. The second direction may be a y-axis. The deflection device 500 may be configured as a large field scanner. For example, a maximum deflection angle in the first direction and/or in the second direction may be at least 10°.

The deflection device 500 may be configured to deflect the machining laser beam L, measurement light 210, 410 and/or a measurement beam along the x-axis (first direction) by a first deflection angle and to deflect the machining laser beam L, measurement light 210, 410 and/or a measurement beam along the y-axis by a second deflection angle. The deflection device 500 may have a zero position with respect to the x-axis and with respect to the y-axis, for which the machining laser beam L, measurement light 210, 410 and/or a measurement beam assumes a zero position.

The zero position may correspond to a non-deflected position of the machining laser beam L, the measurement light 210, 410 and/or the measurement beam, i.e. a (general) zero position. In the non-deflected position, the machining laser beam L, measurement light 210, 410 and/or a measurement beam may extend between the laser machining head 800 and a workpiece or a reference R coaxially to an optical axis of the laser machining head 800 and/or the optical axis of the focusing device 600. In the zero position, the machining laser beam L, measurement light 210, 410 and/or a measurement beam may have the shortest path or distance between the focusing device 600 and a workpiece or a reference R.

The laser machining head 800 comprises at least one optical sensor for monitoring a laser machining process. In order to monitor the laser machining process, the at least one optical sensor may be directed to a position on a workpiece to be machined relative to the machining laser beam L in order to receive measurement light 210, 410 from this position. It may be envisaged that the optical sensor is directed to the position of the machining laser beam L on the workpiece to be machined or is spaced from the position of the machining laser beam L by a (predefined) distance.

In particular, the laser machining head 800 includes a first optical sensor 200. The first optical sensor 200 may include an image sensor, in particular a camera. The laser machining head 800 may include a second optical sensor 300. The second optical sensor 300 may comprise a spectrograph, a spectrometer and/or a photodiode sensor with one or more photodiodes. The laser machining head 800 may include a third optical sensor 400. The third optical sensor 400 may comprise a device for optical distance measurement, in particular an optical interference device, in particular an optical coherence tomograph.

Each of the optical sensors 200, 300, 400 may receive measurement light 210, 410 from the workpiece to be machined in order to monitor the laser machining process. The measurement light 210, 410 for the respective sensor 200, 300, 400 may pass through the focusing device 600 and the deflection device 500. At the zero position, i.e. when the beam path of the machining laser beam L and the beam path of the respective optical sensor 200, 300, 400 are non-deflected, the respective optical sensor 200, 300, 400 is directed to a predetermined position relative to the machining laser beam L. For example, the beam path of the machining laser beam L and the beam path of the respective optical sensor 200, 300, 400 may be directed to the same position, i.e. be identical or coincide.

At least two sensors of the first, second and third optical sensors 200, 300, 400 may be sensitive to different wavelengths or to different wavelength ranges.

Figure 2:
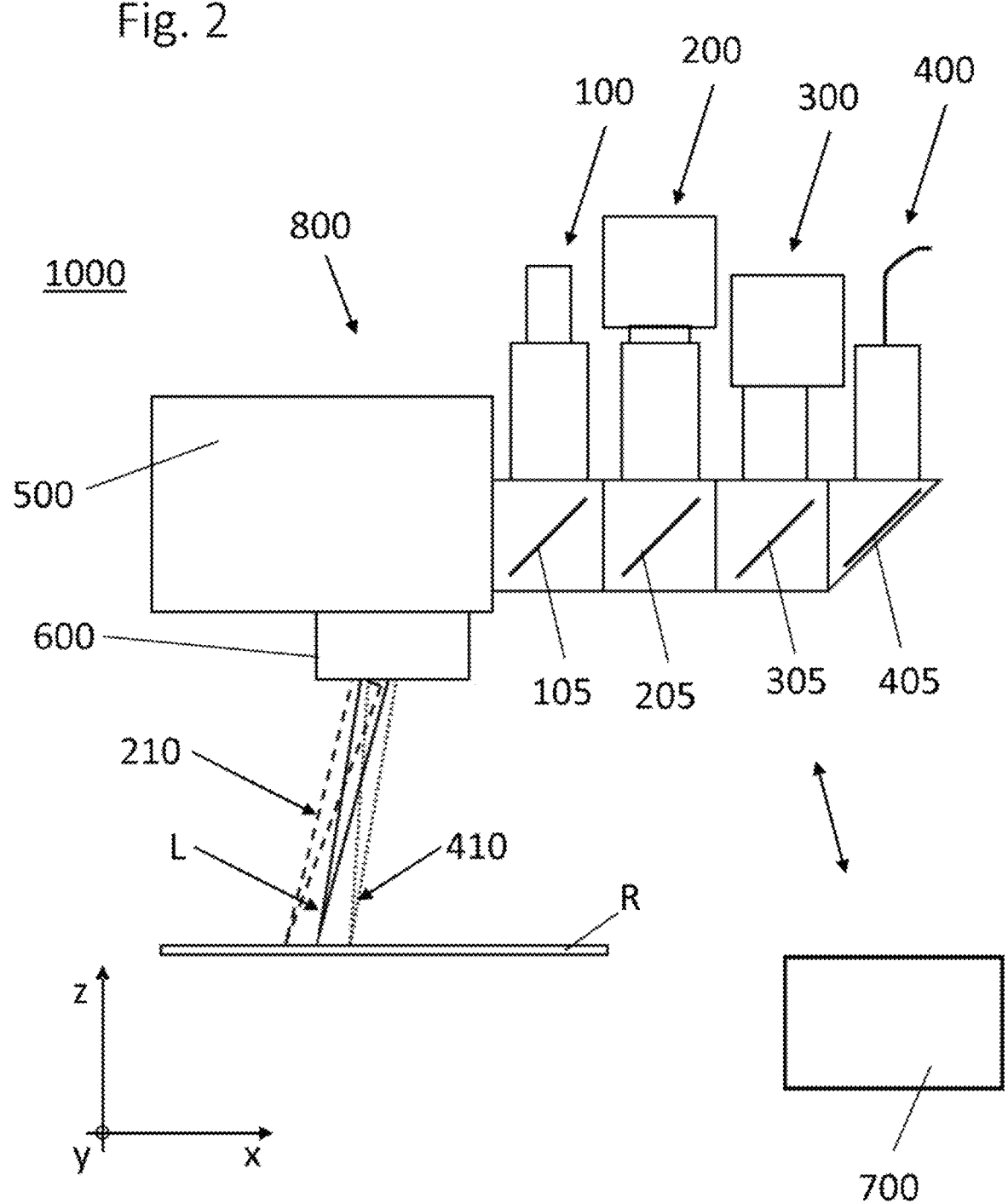
FIG. 2 shows different beam paths of the laser machining system 1000.

The laser machining system 1000 of FIG. 1 is shown in FIG. 2, the machining laser beam L being deflected. When the machining laser beam L is deflected, it may be at an angle (greater than 0) to the optical axis of the focusing device 600.

The beam path of the machining laser beam L, the beam path of measurement light 210 for the first optical sensor 200 and the beam path of measurement light 410 for the third optical sensor 400 are shown schematically in FIG. 2 by way of example. By deflecting the machining laser beam L (by means of the deflection device 500), the machining laser beam L and the beam paths of the optical sensors 200, 300, 400 are directed to a position that is not the same as the zero position.

The measurement light 210, 410 and the machining laser beam L initially extend coaxially. However, due to the different refraction in the focusing device 600 due to the different wavelengths, they are at different angles to the surface and thus there are different points of incidents, i.e. measurement positions. The different wavelengths of the measurement light 210, 410 and the machining laser beam L cause an offset on a workpiece to be machined or a reference R when passing the focusing device 600 in a deflected state. The offset may be caused by chromatic aberration. The monitoring of the laser machining process may become inaccurate as a result of the offset since the optical sensors 200, 300, 400 receive measurement light 210, 410 from a position that deviates from a desired position.

Measurement light 210 for the first optical sensor 200 may pass through the focusing device 600 and the deflection device 500. The measurement light 210 may be coupled into the first optical sensor 200 via a beam splitter 205. Measurement light (not shown in FIG. 2) for the second optical sensor 300 may pass through the focusing device 600 and the deflection device 500. The measurement light may be coupled into the second optical sensor 300 via a beam splitter 305. Measurement light 410 for the third optical sensor 400 may pass through the focusing device 600 and the deflection device 500. The measurement light 410 may be coupled into the third optical sensor 400 via a beam splitter 405.

In order to increase the accuracy of the process monitoring or to maintain the desired measurement position, at least one optical sensor of the laser machining head is calibrated with a reference R according to the invention.

Figure 3:
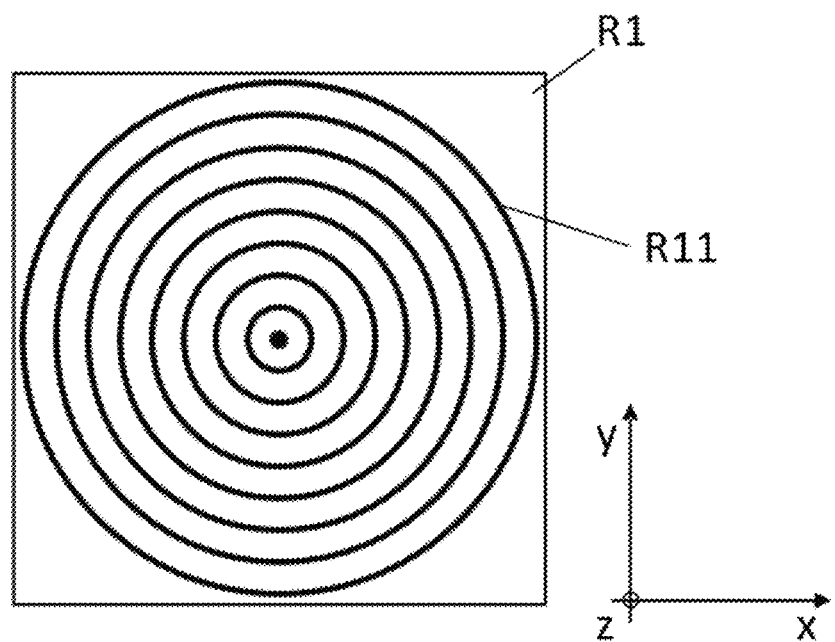
FIG. 3 shows a reference R1.

FIG. 3 shows a reference R1 which may be used to calibrate an optical sensor, for example the third optical sensor 400, e.g. a device for optical distance measurement. The planar extent of a reference may define an x-y plane. A z-direction may be oriented perpendicular to the x-y plane.

The reference R1 may be a calibration plate. The reference R1 may have at least one reference marking R11. The reference mark R11 may be a recess, in particular a recess in a surface of the reference R1. The reference marking R11 may be (entirely) circular. The reference R1 preferably has a plurality of reference markings R11.

In an embodiment, the reference R1 may have at least two, in particular at least three or five, reference markings R11. The reference markings R11 may each be circular. The reference markings R11 are preferably arranged concentrically to one another. The reference markings R11 may be recesses in a surface of the reference R1. The recesses may be sharp-edged, i.e. a transition from the surface of the reference R1 to a recess may be sharp-edged or abrupt. The reference markings R11 may be arranged regularly with respect to one another, in particular at a regular distance from one another. The reference markings R11 may have the same extent.

The extent of the reference marking R11 or the reference markings R11 may be known. Distances between the reference markings R11 may be known.

Figure 4:
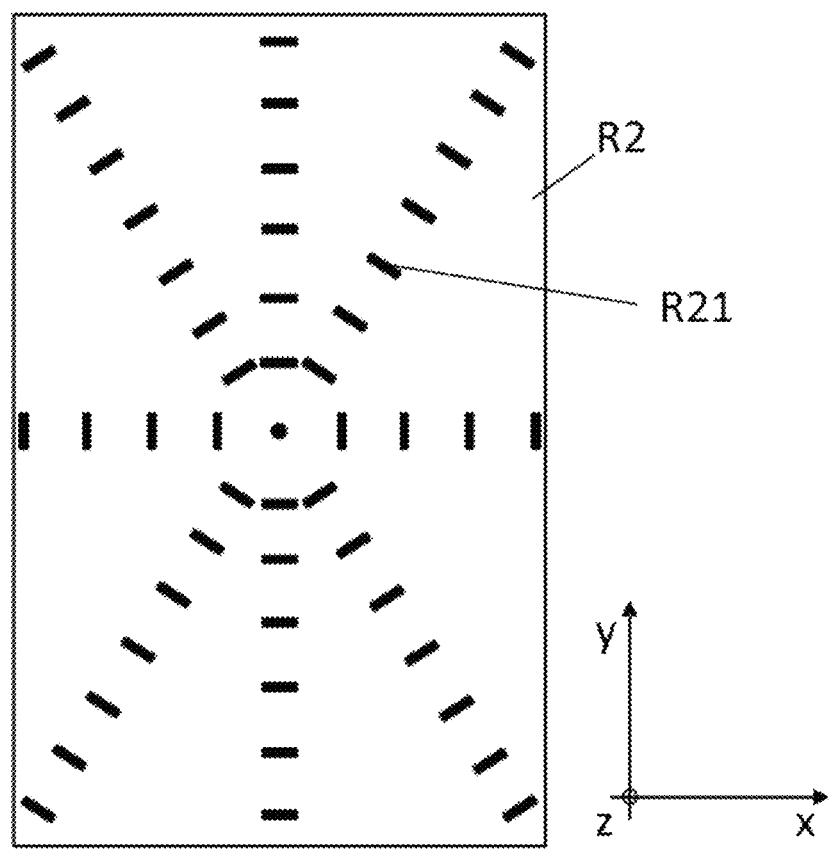
FIG. 4 shows a reference R2.

An alternative embodiment of a reference R2 is shown in FIG. 4. The reference R2 may be a calibration plate. The reference R2 may have at least one reference marking R21. The reference marking R21 may be a recess, in particular a recess in a surface of the reference R2. The reference marking R21 may be in the form of a line, in particular a straight line. The reference R2 preferably has a plurality of reference markings R21.

The reference R2 may have a plurality of reference markings R21, which are arranged radially starting from a center or oriented outwards. The reference R2 may have a plurality of rows of reference markings R21, with each row of reference markings R21 including a plurality of reference markings R21, which are arranged radially outwards starting from a center. There may be no reference markings between the rows of reference markings R21.

In general, the positions and/or extents of reference markings R11, R21 may be predetermined.

For example, a lateral calibration of the third optical sensor 400, e.g. an optical coherence tomography (OCT), may be carried out vie the reference R1 or R2 configured as a calibration plate with recesses. For the calibration, the reference R1, R2 may be positioned relative to the laser machining head 800 (cf. FIGS. 1 and 2). Furthermore, an optical measurement beam may be radiated onto the reference R1, R2 for the calibration. Starting from the third optical sensor 400, the optical measurement beam may pass through the deflection device 500 and the focusing device 600 so that it is incident on the reference R1, R2.

In particular, the reference R1, R2 may be positioned or aligned with respect to the laser machining head 800 such that a predefined zero position on the reference R1, R2 corresponds to a zero position of the optical measurement beam. The zero position on the reference R1, R2 may be a center of the reference R1, R2. A reference marking R11, R21 may be provided at the zero position on the reference R1, R2. The zero position of the optical measurement beam may be realized when the optical measurement beam is not deflected, i.e. is coaxial with or parallel to the optical axis of the focusing device 600, for example.

The surface of the reference R1, R2 may be sampled or scanned or traversed by the optical measurement beam. During the scanning, the optical measurement beam may pass at least one, preferably a plurality of, reference markings R11, R21. The scanning may be carried out by deflecting the optical measurement beam by means of the deflection device 500.

The measurement beam may scan the surface of the reference R1, R2 in at least one direction, preferably in two mutually orthogonal directions, e.g. in the x and y directions. Moreover, additional diagonal scans may be carried out to verify or increase the accuracy. During the scan, the depth may be measured and the current x, y position may be acquired at the same time. Through the optical measurement beam, a measurement light may be received by the third optical sensor 400 as a reflected portion of the optical measurement beam. An optical measurement signal may be generated based on the measurement light received. A deviation of a position on the reference R1, R2 and a target position may be determined on the basis of the optical measurement signal. A correction value may be determined based on the deviation. Since the lateral offset due to the chromatic aberration is zero at x=0 and y=0, but increases with increasing deflection, the offset for a plurality of measurement positions may be determined and corrected using the method. A plurality of correction values for different deflection positions or measurement positions may be determined and stored. Here, the respective correction value may be associated with a respective deflection position. The deflection position may be a position or attitude of the deflection device. The deflection position may also be a position in a coordinate system, for example in a coordinate system defined by the reference R1, R2. A correction function or a lookup table may be determined on the basis of the correction value or the correction values.

For example, the reference R1, R2 may have two reference markings R11, R21. A distance of the reference markings R11, R21 on the surface of the reference R1, R2 may be known. When the surface of the reference R1, R2 is scanned, a distance between the reference markings R11, R21 may be determined as the measured distance value. The value of the known (real) distance and the measured distance value may be compared. Based on the difference (deviation) between the values, a correction value for this measurement position may be determined. The correction value may be stored. For example, based on correction values for different measurement positions, a lookup table or a correction function $f(x,y)$ may be created in order to correct the measurement position accordingly in future measurements, for example when monitoring a laser machining process, or to associate the measurement signals with the corresponding actual measurement position. As a result, the accuracy of the monitoring of the laser machining process can be increased. In particular, a chromatic aberration caused by the focusing device may be compensated for by the correction value.

After the calibration, a method for process monitoring of a laser machining process may be carried out using the optical sensor. The method for process monitoring may be carried out before the laser machining process (pre-process) in order, for example, to obtain a workpiece geometry or to define a machining position for the laser machining process. The method for process monitoring may also be carried out after the laser machining process (post-process) in order to measure a machining result, such as a weld seam, for example. In the process monitoring method, the beam path of the optical sensor or the measurement beam of a coherence tomograph may be directed by the deflection device to a predefined monitoring position in order to generate a measurement signal for this position. Here, a control signal of the deflection device for deflecting the beam path or the measurement position of the optical sensor may be adjusted to the predefined monitoring position based on the correction value determined. When the third sensor 400, e.g. the optical coherence tomograph, is used, for example, to measure a distance to the workpiece surface before the actual laser machining process, in particular when the machining laser beam is switched off, a lateral offset between the measurement position and the target position, e.g. the position of the subsequent laser machining process, can be reduced or even avoided. Thus, a position of a specific feature, e.g. an elevation, a recess, a step, etc., can still be accurately determined for the subsequent laser machining process.

Figure 5A:
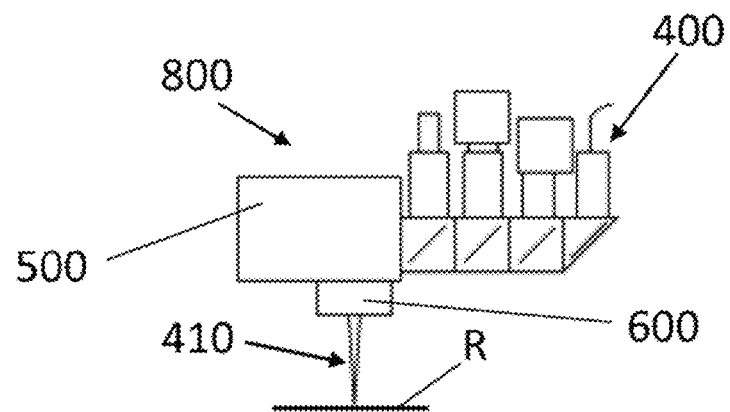
FIGS. 5a to 5c schematically show an axial calibration of a laser machining head 800.
Figure 5B:
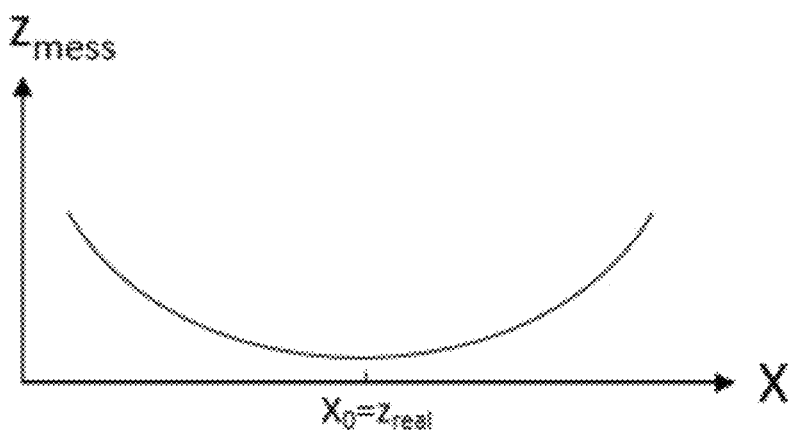
Figure 5C:
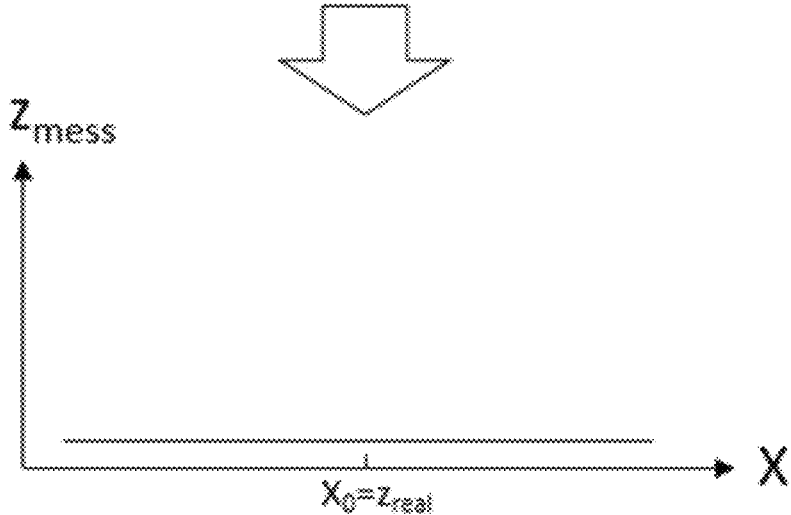

FIGS. 5a to 5c schematically show an axial calibration of an optical sensor, for example the third optical sensor 400. FIG. 5a shows a laser machining head 800 as disclosed herein.

The reference R may be a calibration plate with a plane or flat surface. The reference R may be oriented in parallel to the machining system and may be located at the work distance or in the focal position. This reference R may not have any reference markings.

The measurement beam of the optical sensor 400 is radiated onto the reference R at a zero position, i.e. non-deflected position or x=0 and y=0. At the zero position, the measurement beam is not deflected by the deflection device 500, i.e. the beam path of the measurement beam emerges coaxially or parallel to the optical axis of the focusing device 600 from the focusing device 600 in the direction of the reference R from the laser machining head 800.

At the zero position, the shortest distance to the reference R may be determined by the optical sensor 400. This distance should correspond to the work distance and is defined as z=0. In FIG. 5b, this distance is denoted as $z_{real}$ at the zero position $x_0$.

When the measurement beam of the optical sensor 400 is deflected by the deflection device 500, i.e. x and/or y is not equal to zero, the measured distance between the reference R and the laser machining head 800 increases with increasing deflection. The deflection may take place in one direction, for example in the x-direction. The measured distance may be denoted as $z_{mess}$ (see FIG. 5b).

Correction values may be determined based on the measured distance at the zero position and the measured distances at different deflection positions or measurement positions. For example, a difference between the distance at the zero position and a respectively measured distance at a deflection position or measurement position may be determined. A respective correction value may be formed on the basis of the difference. The respective correction value may be associated with the associated deflection position or measurement position.

In a future measurement, a respective correction value may be applied to a respective measurement result in order to correct the measurement result. As a result, an accurate distance measurement may be obtained even with an increase in the beam path length due to the deflection of the beam path by the deflection device 500. For example, based on correction values for different measurement positions, a lookup table or a correction function f(x,y) may be created in order to correct the measurement value accordingly in future measurements, for example when monitoring a laser machining process.

A distance measurement after an axial correction is shown in FIG. 5c. The corrected measured distance $z_{mess}$ is constant in the x-direction for different deflection positions or measurement positions. Of course, the same calibration may be performed for the y-direction. The values of the axial calibration may also be used with an optical coherence tomograph in order to adjust the measurement range accordingly with a dynamic reference arm.

Figure 6A:
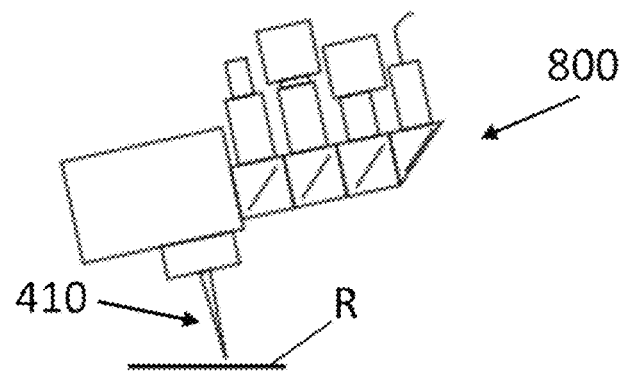
FIGS. 6a and 6b schematically show a detection of a misalignment of the laser machining head 800.
Figure 6B:
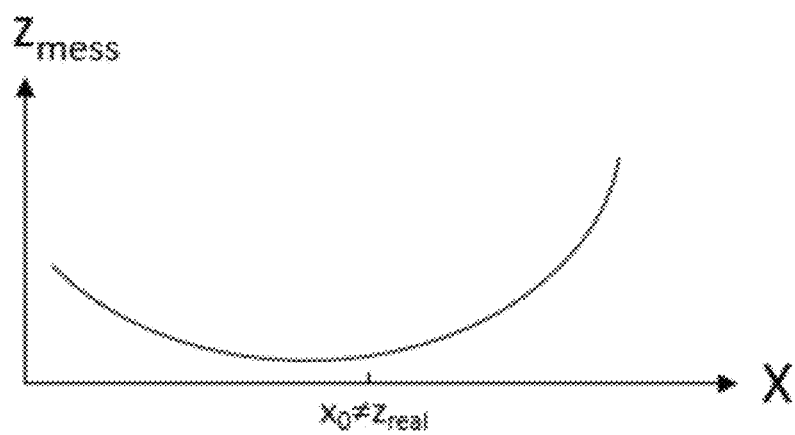
Figure 6B:
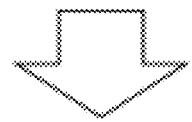
Figure 6B:
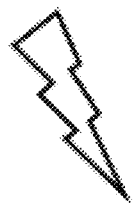

A tilt of the laser machining head may also be detected as part of the axial calibration of the optical coherence tomograph. These values may be used for manual or automatic alignment (e.g. with a robot arm) of the laser machining head perpendicular to the work plane or workpiece surface. FIGS. 6a and 6b schematically show a detection of a misalignment of the laser machining head 800 relative to the reference R, which may be carried out in a way similar to the axial calibration of the third optical sensor 400.

In order to detect the misalignment, the optical measurement beam of the third sensor 400 may be radiated onto the reference R at a zero position. Furthermore, the measurement beam may be deflected to different positions in one direction, for example in the x-direction. A distance between the laser machining head 800 and the reference R may be obtained at the various positions. The different positions may be in the positive direction and in the negative direction, starting from the zero position or zero orientation. Based on the values of the distance measurements, it may be determined whether the laser machining head 800 is tilted relative to the reference R.

In particular, it may be recognized whether the lowest value of the distance measurement was measured at the zero position or zero orientation. If this is not the case, i.e. a lower value of the distance measurement was determined in a deflected position than in the zero position, it may be recognized that there is a misalignment.

It may be checked whether a value of the distance measurement at a deflection in the positive direction is substantially (±5% or ±1%) equal to a value of the distance measurement at a deflection in the negative direction. The deflections in the positive direction and in the negative direction may be the same in absolute terms. When the values of the distance measurement differ, a misalignment may be detected.

A signal or message may be generated which prompts a user to correct the tilt of the laser machining head 800. Alternatively, the laser machining head 800 may be positioned (automatically) such that there is no misalignment, i.e. the misalignment is corrected.

Figure 7:
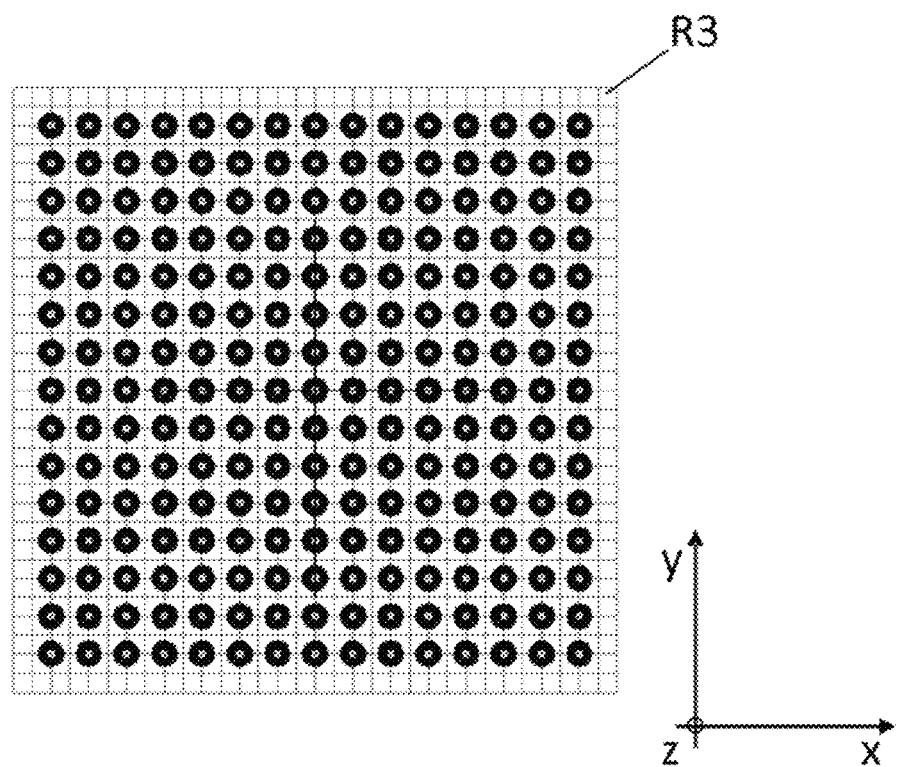
FIG. 7 shows a reference R3.
Figure 8:
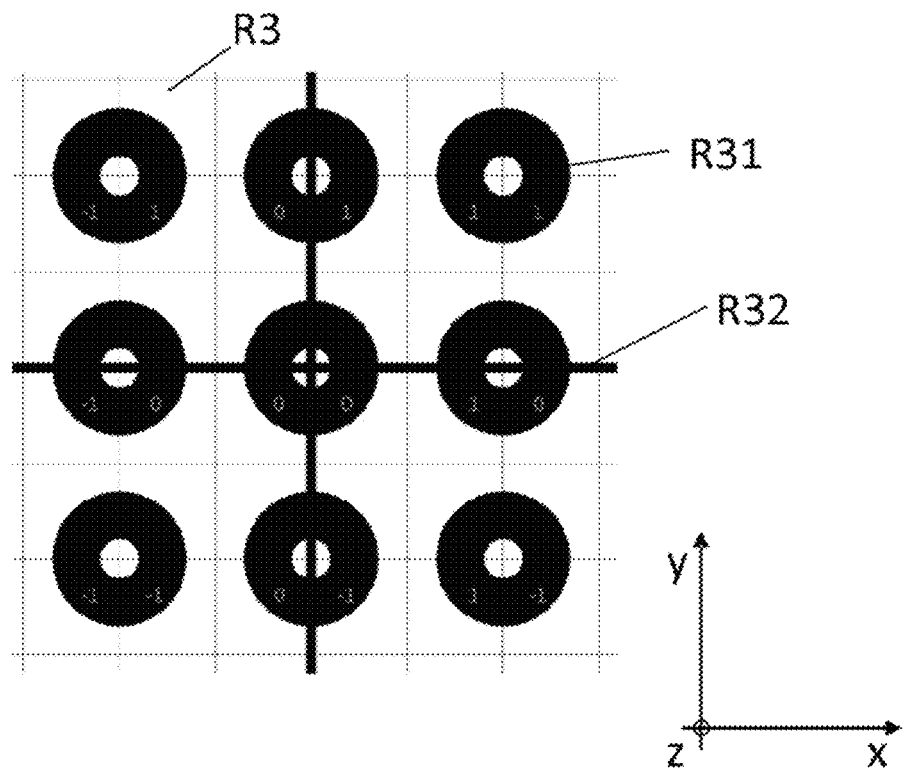
FIG. 8 shows an enlarged portion of the reference R3.

FIG. 7 shows a reference R3, which may be used in particular to calibrate the second sensor 200, e.g. an image sensor or a camera, and FIG. 8 shows an enlargement of a portion of the reference R3.

In the case of an image sensor or a camera, which is also coupled coaxially into the beam path of the machining laser, a lateral offset does not have a serious effect initially since a sensor chip usually captures a larger area (image field).

However, the lateral offset has greater effects when the image is used to define a machining position in relation to a feature to be recognized, e.g. via automated image recognition or feature recognition. When the lateral offset is not calibrated, the feature can be recognized but machining takes place at a different point. Problems can arise, especially with small components or small features to be welded. An example is contacting a battery where the positive and negative poles are very close together and an incorrectly positioned weld seam would result in a short circuit and a possible explosion of the battery cell. For this reason, it is also necessary to calibrate an image sensor or a camera laterally and/or rotationally as accurately as possible.

The reference R3 shown in FIGS. 7 and 8 may be a calibration plate. The reference R3 may have at least one first reference marking R31. The reference R3 may have at least one second reference marking R32. The first reference marking R31 and the second reference marking R32 may be different or different types of reference markings. The reference R3 preferably has at least two first reference markings R31 and at least two second reference markings R32. The reference markings of the reference R3 may include optical features, e.g. colored, in particular black, markings on a light background.

The first reference marking R31 may be a circle, a triangle, a square, in particular a rectangle or a square, or an n-gon. The first reference mark R31 may be a geometric figure. The reference R3 may have at least five, preferably at least ten, more preferably at least twenty, first reference markings R31. The first reference markings R31 may be provided regularly on the reference R3. The first reference markings R31 are preferably arranged in a (regular) grid on the reference R3.

The second reference marking R32 may be a line, in particular a straight line. At least two second reference markings R32 may each be a line. The lines may cross. The reference R3 shown in FIGS. 7 and 8 has lines arranged in a grid and circles arranged at the crossing or intersection points of the grid. In the case of lines as the second reference markings R32, a lateral position can be recognized more accurately. In addition, a rotation of the first optical sensor 200 can be detected, i.e. a rotation of a coordinate system thereof in relation to the coordinate system or the axes of the deflection device 500. In addition to a calibration in the x- and y-directions, the reference 3 may therefore also be used to align a rotation of the optical sensor. This is particularly relevant for a deflection device 500 with galvo mirrors that are not arranged at right angles.

The first reference marking R31 or the first reference markings R31 and the second reference marking R32 or the second reference markings R32 may overlap at least in sections. For example, at least one second reference marking R32 may overlap one or more first reference markings R31. A first reference marking R31 may be overlapped by at least two second reference markings R32. In particular, a first reference marking R31 may be located at an intersection of at least two second reference markings R32. Positions or distances between the first reference markings R31 and/or the second reference markings R32 on the reference R3 may be predetermined.

For the calibration, the reference R3 may be positioned relative to the laser machining head 800 (cf. FIGS. 1 and 2). An image of the reference R3 may then be captured by the first optical sensor 200. The reference markings R31, R32 may be recognized by means of image processing, e.g. by the first optical sensor itself or by the computing device.

The reference R3 may be positioned or aligned to the laser machining head 800 such that a predefined zero position on the reference R3 corresponds to a zero position of the beam path of the first optical sensor 200. The zero position on the reference R3 may be a center of the reference R3. At least one reference marking R31, R32 may be provided at the zero position on the reference R3. Two reference markings R31, R32, in particular two second reference markings R32, may cross at the zero position. The zero position of the beam path may be obtained when the beam path is not deflected, i.e., for example, is coaxial with the optical axis of the focusing device 600 or is parallel to the optical axis.

In a next step, the beam path of the first optical sensor 200 may be deflected by a discrete distance by which the machining laser beam must be deflected in order to be directed to an optical feature, i.e. to a reference marking R31, R32. The discrete distance may be at least 1 mm, preferably at least 5 mm. Due to the chromatic aberration, the deflected distance for the wavelength of the machining laser beam does not correspond to the distance for the observation wavelength of the first optical sensor. However, the difference is small so that the reference markings R31, R32 on the reference 3 are still included in the image field of the first optical sensor 200 and can be recognized automatically (e.g. by image processing).

Subsequently, again an image is captured by the first optical sensor 200 and the reference markings R31, R32 are recorded. A distance or lateral offset between the position of the deflected beam path and the reference marking R31, R32 may be determined as a function of the measurement position or deflection position. A correction value may be determined based on the distance. The correction value may be stored for the respective deflection position or measurement position, e.g. in a lookup table. Alternatively, a correction function f(x,y) may be determined. In future measurements, for example when monitoring a laser machining process, the correction value may be applied to the measured value in order to correct the measurement position accordingly or to associate pixels (i.e. positions in the image) with a corresponding actual position.

The reference markings R31, R32, in particular the first reference markings R31, may each have an indicator. A position of the respective reference marking R31, R32 relative to the zero position may be derived or determined on the basis of the indicator.

The size and/or the distance of the reference markings R31, R32 may be known. The optical sensor may be a camera. A pixel size of an image of the camera may be determined by the size or the distance of the reference markings R31, R32. For example, in the example of FIG. 7, a calibration between pixel size and real size may be performed based on the known circular diameter of the first reference marking R31 or the known distance between the lines of the second reference marking R32 so that distances can later be determined from the image. Furthermore, refocusing the first optical sensor 200 may be carried out after the beam path has been deflected by the discrete distance or before the image for calibrating the first sensor 200 is captured.

Furthermore, an orientation of the optical sensor may be adapted to an orientation of the deflection device 500, i.e. the rotational position of the first optical sensor may be aligned, in particular with the orientation of the deflection device 500. Thus, an x- or y-axis in the image may correspond to an x- or y-axis of the deflection device 500.

After the calibration, a method for process monitoring of a laser machining process may be carried out by the first optical sensor 200. The process monitoring method may be carried out before the laser machining process (pre-process), during the laser machining process (in-process) or after the laser machining process (post-process), for example to obtain a workpiece geometry, to define a machining position for the laser machining process, or to measure the machining result, such as a weld seam. In the method for process monitoring, the beam path of the first optical sensor 200 may be directed by the deflection device to a predefined monitoring position in order to generate a measurement signal for this position. In this case, a control signal of the deflection device 500 for deflecting the beam path or the measurement position of the first optical sensor may be adapted to the predefined monitoring position based on the determined correction value. Alternatively, a monitoring signal, i.e., in the case of an image sensor, a position of a feature determined from the image, may be adjusted based on the determined correction value. When the first sensor 200, e.g. the camera, is used, for example, to determine a machining position on the workpiece surface before the actual laser machining process, in particular when the machining laser beam is switched off, a lateral offset between the position determined in the image and the actual position, e.g. the target position the subsequent laser machining process, can be reduced or even avoided. Thus, an actual position of a particular feature, e.g. an elevation, a recess, a step, etc., can still be accurately determined for the subsequent laser machining process.

Figure 9:
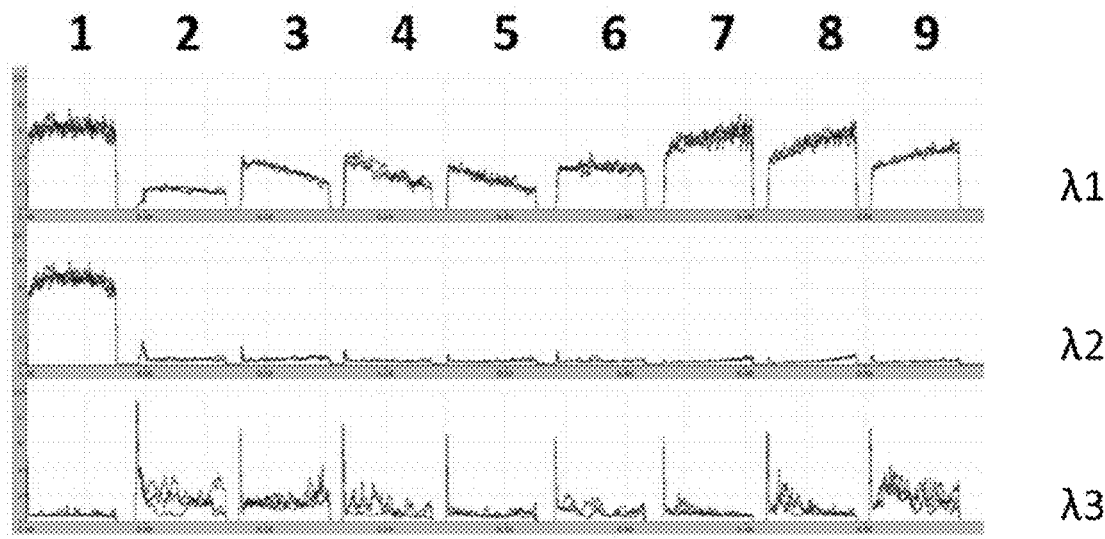
FIG. 9 shows a measurement of an optical sensor.
Figure 10:
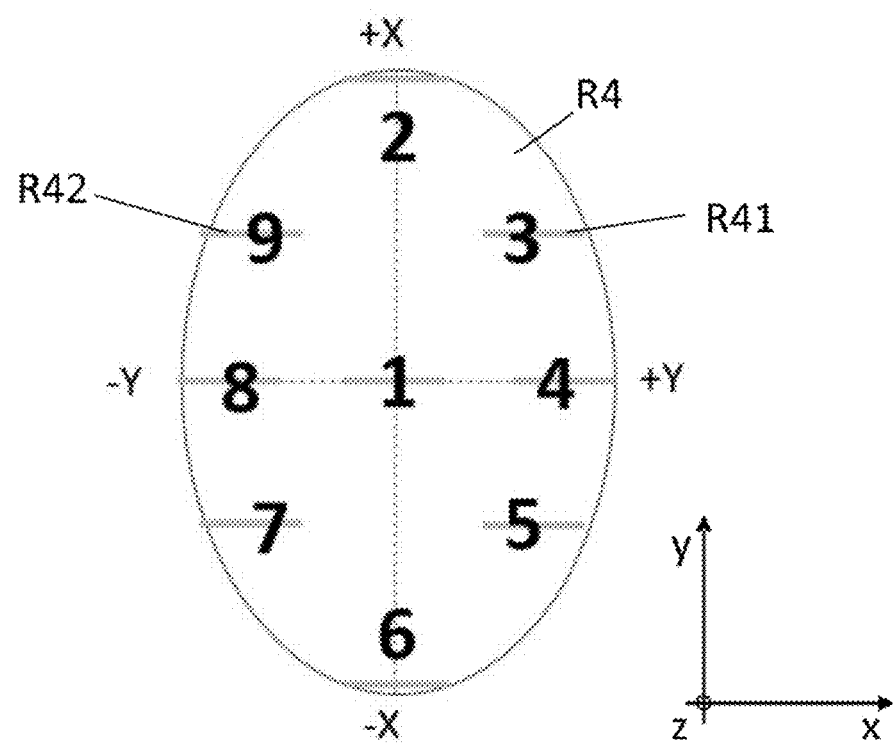
FIG. 10 shows a reference R4.

FIG. 9 shows a measurement of an optical sensor, in particular a second optical sensor 300, for example a photodiode sensor with one or more photodiodes. FIG. 10 shows a reference R4 that may be used for calibrating the second optical sensor 300.

The second optical sensor 300 may include three photodiodes. Each of the photodiodes may be sensitive to a different wavelength range $\lambda 1$, $\lambda 2$, $\lambda 3$. For example, the first photodiode may be sensitive to a visible wavelength range $\lambda 1$. The second photodiode may be sensitive to an infrared wavelength range $\lambda 2$. The third photodiode may be sensitive to a wavelength range $\lambda 3$ of the machining laser beam L.

The different spectral sensitivities of the photodiodes result in different measurement positions for the photodiodes caused by chromatic aberration.

In the case of photodiode-based process monitoring during laser machining, a lateral offset due to chromatic aberration can be compensated when an additional "series-connected" deflection device is provided for each photodiode. However, an additional deflection device takes up space, causes additional costs and is demanding in terms of control technology (synchronization of both deflection devices). However, when the lateral chromatic aberration is not corrected, different intensities of the measurement light may be acquired so that, depending on the deflection position or measurement position, different signal levels result for nominally identical welds (see FIG. 9). A comparative measurement or process monitoring with previously acquired reference values is therefore no longer possible or only possible with a significantly reduced accuracy or error detection rate.

In order to avoid this, a calibration using the reference R4 is proposed according to the present disclosure. The reference R4 may be a test workpiece. The reference R4 may have a planar configuration and may have a planar or flat or smooth surface.

For the calibration, the reference R4 may be positioned relative to the laser machining head 800 (cf. FIGS. 1 and 2). At the zero position, i.e. non-deflected position, the machining laser beam L may be directed onto the reference R4, in particular the test workpiece. A test machining process may be performed at the zero position and the emitted process emissions may be detected by the second optical sensor 300. Process emissions of different wavelength ranges are preferably detected by different photodiodes of the optical sensor.

A first reference marking R41 may be formed on the reference R4 as a result of the test machining process.

The machining laser beam L is now deflected to a reference position and a further test machining process is carried out there. The process emissions emitted are detected by the second optical sensor 300. A further reference marking R42 may be formed on the reference R4 as a result of the further test machining process.

A deviation of the intensity of the process emissions detected at the reference position from the intensity of the process emissions detected at the zero position may be determined. A correction value may be determined based on the deviation. Such a correction value is preferably determined for each of the photodiodes of the second optical sensor. The correction value may be a correction factor.

It is preferred that at least three, preferably at least five, more preferably at least nine test machining processes are performed. Based on each of the test machining processes, a correction value for the respective position can be determined. Since all test machining procedures are performed nominally identically, only at different reference positions, equal intensities for the different photodiodes should be measured at each position. Due to the chromatic aberration, the intensities or signal levels differ.

The different intensities for the different photodiodes are indicated in FIG. 9. The upper curve corresponds to a measured intensity of a first photodiode, the middle curve corresponds to a measured intensity of a second photodiode, and the lower curve corresponds to a measured intensity of a third photodiode, respectively at the reference positions 1 to 9 or for the test machining processes 1 to 9.

For example, at position 1 on the reference R4, which may be understood as the zero position, the measured intensity for the first and second photodiodes is relatively high. The measured intensity for the third photodiode is relatively low at this position. At position 7, the measured intensity of the first photodiode is relatively high, the measured intensity of the second photodiode is relatively low, and the measured intensity of the third photodiode is between the measured intensity of the first and second photodiodes.

At reference position 1, i.e. the zero position ($x=0$, $y=0$), the measured intensity or the measurement signal is considered ideal for all photodiodes. At the other reference positions (x and/or y not equal to zero), the measured intensity differs from the ideal intensity. From the difference, a correction value or a correction factor for the respective reference position may be determined for each position. The correction values for the various reference positions may be stored in a lookup table or used to determine a correction function. For a measurement position other than the zero position, the correction value that corresponds to the reference position closest to the measurement position may be used. Alternatively, an interpolation of the correction values of the reference positions adjacent to the measurement position may be used in order to determine an interpolated correction value for a measurement position that differs from the reference positions.

For a future measurement at a measurement position different from the zero position, the measured intensity or the measurement signal of a respective photodiode may be adjusted based on the intensity or the measurement signal at the zero position, in particular by means of the determined correction value. The adjustment may be performed by hardware or software reinforcement. Alternatively, quality criteria, such as reference curves or envelope curves, may be adjusted based on the correction value.

After the calibration, a method for process monitoring of a laser machining process may be carried out by the second optical sensor 300. The process monitoring method using the second optical sensor may be carried out during the laser machining process (in-process) in order, for example, to make statements about the laser machining process based on the intensities of the detected process emissions. In the method for process monitoring, the beam path of the second optical sensor 300 may be directed by the deflection device 500 to a predefined monitoring position in order to generate a monitoring signal for this position. Before evaluating the monitoring signal for process monitoring, the monitoring signal may be adjusted based on the correction value determined.

According to the present disclosure, all optical sensors of the laser machining head may be calibrated such that they detect signals that are comparable to one another, regardless of a deflection position or a position in the scan field, or measure them at exactly the location in the x,y,z direction at which later also the laser machining process takes place or at which the laser machining process previously took place. This simplifies the complexity of the system since no longer a plurality of coordinate systems have to be considered.

The invention claimed is:

1. A method for calibrating at least one optical sensor of a laser machining head for machining a workpiece using a machining laser beam, wherein said laser machining head includes a first optical sensor, a deflection device and a focusing device and a beam path of said first optical sensor passes through said deflection device and said focusing device, said method comprising the steps of:
 deflecting the beam path of said first optical sensor by said deflection device to a first position on a first reference;
 generating a first optical measurement signal based on measurement light received by said first optical sensor from the first position on said first reference; and
 determining a first correction value for calibrating said first optical sensor based on the first optical measurement signal and according to a deviation of the first position on said first reference from a first target position.

2. The method according to claim 1, wherein said laser machining head includes a second optical sensor, the beam path of which passes through said deflection device and said focusing device, and said method further comprises the steps of:
 deflecting the beam path of said second optical sensor by said deflection device to a first position on a second reference;
 generating a second optical measurement signal based on measurement light received by said second optical sensor from the first position on said second reference; and
 determining a second correction value for calibrating said second optical sensor based on the second optical measurement signal and according to a deviation of the first position on said second reference from a second target position.

3. The method according to claim 1, wherein said laser machining head includes a third optical sensor, the beam path of which passes through said deflection device and said focusing device, and said method further comprises the steps of:
 deflecting the beam path of said third optical sensor by said deflection device to a first position on a third reference;
 generating a third optical measurement signal based on measurement light received by said third optical sensor from the first position on said third reference; and
 determining a third correction value for calibrating said third optical sensor based on the third optical measurement signal and according to a deviation of the first position on said third reference from a second target position.

4. The method according to claim 1, wherein:
 the beam path of the at least one optical sensor is deflected by said deflection device to a plurality of positions on the respective reference in order to generate a corresponding optical measurement signal; and/or
 the beam path of the at least one optical sensor scans a surface of the respective reference by said deflection device in order to generate corresponding optical measurement signals.

5. The method according to claim 1, wherein the beam path of the at least one optical sensor is directed by said deflection device in parallel or coaxially to an optical axis of said focusing device to the respective reference in order to generate a corresponding optical measurement signal at a zero position.

6. The method according to claim 1, wherein said laser machining head includes a plurality of different optical sensors which are sensitive to different wavelength ranges.

7. The method according to claim 1, wherein said laser machining head includes a plurality of different optical sensors which are calibrated with different references.

8. The method according to claim 1, wherein the at least one optical sensor is a device for optical distance measurement, a conoscopy device, a travel time measuring device, an optical interference device, an optical coherence tomograph, an image sensor, a camera, a spectrograph, a spectrometer and/or a photodiode sensor with one or more photodiodes.

9. The method according to claim 8, wherein the at least one optical sensor comprises an optical interference device or an optical coherence tomograph and wherein said reference is a first calibration plate having a plurality of recesses at predetermined positions.

10. The method according to claim 9, further comprising:
 aligning the calibration plate such that a predetermined zero position on the calibration plate corresponds to a zero position of an optical measurement beam of the optical sensor;
 scanning a surface of the calibration plate with the optical measurement beam by said deflection device and generating corresponding measurement signals;
 determining the positions of the recesses on the calibration plate based on the measurement signals; and
 determining correction values according to deviations of the determined positions of the recesses from predetermined reference positions.

11. The method according to claim 9, further comprising:
 directing said machining laser beam to a zero position on a test workpiece, performing a first test machining process, and detecting the process emissions emitted thereby by the optical sensor;
 deflecting said machining laser beam to a reference position, performing a second test machining process at the reference position, and detecting the process emissions emitted thereby by the optical sensor; and determining a fourth correction value according to a deviation of the intensity of the process emissions detected at the reference position from the intensity of the process emissions detected at the zero position.

12. The method according to claim 9, wherein the at least one optical sensor comprises an image sensor or a camera and wherein the reference is a second calibration plate having a plurality of optical features at predetermined reference positions.

13. The method according to claim 12, further comprising:

aligning the calibration plate such that a predetermined zero position on the calibration plate corresponds to a zero position of the beam path of the optical sensor;

deflecting the beam path of the optical sensor by a discrete distance by which said machining laser beam must be deflected in order to be directed to an optical feature of the calibration plate; and determining a fifth correction value corresponding to a distance from the position of the deflected beam path to the optical feature.

14. The method according to claim 8, wherein the at least one optical sensor comprises a spectrograph, a spectrometer and/or a photodiode sensor with one or more photodiodes for detecting process emissions, and wherein said reference is a test workpiece on which a test machining process is carried out by the machining laser beam at at least one predetermined reference position by deflecting said machining laser beam by said deflection device.

15. The method according to claim 1, wherein said focusing device comprises an F-Theta lens and/or is arranged downstream of said deflection device in relation to the beam propagation direction of the machining laser beam in the laser machining head.

16. The method according to claim 1, wherein:

a scan field of said deflection device has a length and/or width of at least 50 mm; and/or said machining laser beam can be deflected by said deflection device by an angle of at least 5°.

17. A method for process monitoring of a laser machining process, said method comprising the method for calibrating according to claim 1 and the steps of:

deflecting the beam path of said first optical sensor by said deflection device to a predetermined monitoring position, and receiving measurement light from the monitoring position by said first optical sensor and generating a monitoring signal based on the measurement light for process monitoring received from the monitoring position, wherein a control signal of said deflection device for deflecting the beam path of said first optical sensor is adjusted to the monitoring position based on the correction value determined or wherein the monitoring signal for the process monitoring is adjusted based on the correction value determined.

18. A laser machining system including a laser machining head for machining a workpiece by a machining laser beam and a computing device, wherein said laser machining head comprises a first optical sensor, a deflection device and a focusing device;

said deflection device and said focusing device lie in a beam path of said first optical sensor;

said deflection device is configured to deflect the beam path of said first optical sensor to a first position on a first reference;

said first optical sensor is configured to receive measurement light from the first position on said first reference and to generate a first optical measurement signal based on the measurement light; and said computing device is configured to determine a correction value for calibrating said first optical sensor based on the first optical measurement signal and according to a deviation of the first position on said first reference from a first target position, wherein the at least one optical sensor comprises an optical interference device or an optical coherence tomograph and said reference is a calibration plate having a plurality of recesses at predetermined positions.

19. A method for calibrating at least first and second optical sensors of a laser machining head for machining a workpiece using a machining laser beam, wherein said laser machining head includes a first optical sensor, a second optical sensor, a deflection device and a focusing device and beam paths of said first and second optical sensors pass through said deflection device and said focusing device, said method comprising the steps of:

deflecting the beam path of said first optical sensor by said deflection device to a first position on a first reference;

generating a first optical measurement signal based on measurement light received by said first optical sensor from the first position on said first reference; and determining a first correction value for calibrating said first optical sensor based on the first optical measurement signal and according to a deviation of the first position on said first reference from a first target position, deflecting the beam path of said second optical sensor by said deflection device to a first position on a second reference;

generating a second optical measurement signal based on measurement light received by said second optical sensor from the first position on said second reference; and determining a second correction value for calibrating said second optical sensor based on the second optical measurement signal and according to a deviation of the first position on said second reference from a second target position.

* * * * *